United States Patent [19]
Reynolds

[11] Patent Number: 5,905,991
[45] Date of Patent: May 18, 1999

[54] SYSTEM AND METHOD PROVIDING NAVIGATION BETWEEN DOCUMENTS BY CREATING ASSOCIATIONS BASED ON BRIDGES BETWEEN COMBINATIONS OF DOCUMENT ELEMENTS AND SOFTWARE

[76] Inventor: Mark L Reynolds, 2518 N. 850 W., Provo, Utah 84604

[21] Appl. No.: 08/915,770

[22] Filed: Aug. 21, 1997

[51] Int. Cl.[6] ................................................. G06F 17/30
[52] U.S. Cl. ................................................ 707/501; 707/513
[58] Field of Search .................................. 707/500, 501, 707/513; 345/335; 395/200.48, 200.49

[56] References Cited

U.S. PATENT DOCUMENTS

| | | | |
|---|---|---|---|
| 4,575,813 | 3/1986 | Bartlett et al. | 364/900 |
| 4,608,664 | 8/1986 | Bartlett et al. | 364/900 |
| 4,648,067 | 3/1987 | Repass et al. | 364/900 |
| 4,716,404 | 12/1987 | Tabata et al. | 340/723 |
| 4,748,678 | 5/1988 | Takeda et al. | 382/56 |
| 4,803,643 | 2/1989 | Hickey | 364/523 |
| 4,984,162 | 1/1991 | Torii et al. | 364/518 |
| 5,113,341 | 5/1992 | Kozol et al. | 364/419 |
| 5,140,521 | 8/1992 | Kozol et al. | 364/419 |
| 5,142,674 | 8/1992 | Barker et al. | 395/600 |
| 5,144,555 | 9/1992 | Takadachi et al. | 364/419 |
| 5,146,552 | 9/1992 | Cassorla et al. | 395/145 |
| 5,159,667 | 10/1992 | Borrey et al. | 395/148 |
| 5,164,899 | 11/1992 | Sobotka et al. | 364/419 |
| 5,179,650 | 1/1993 | Fukui et al. | 395/148 |
| 5,185,698 | 2/1993 | Hesse et al. | 364/419 |
| 5,228,121 | 7/1993 | Fontaine et al. | 395/145 |
| 5,251,314 | 10/1993 | Williams | 395/600 |
| 5,263,132 | 11/1993 | Parker et al. | 395/146 |
| 5,276,793 | 1/1994 | Borgendale et al. | 395/148 |
| 5,280,574 | 1/1994 | Mizuta et al. | 395/146 |
| 5,285,526 | 2/1994 | Bennett, III et al. | 395/100 |
| 5,295,236 | 3/1994 | Bjorge et al. | 395/134 |
| 5,299,304 | 3/1994 | Williams et al. | 395/148 |
| 5,302,969 | 4/1994 | Kuroda et al. | 345/168 |
| 5,323,312 | 6/1994 | Saito et al. | 364/419.1 |
| 5,325,484 | 6/1994 | Motoyama | 395/162 |
| 5,341,469 | 8/1994 | Rossberg et al. | 395/145 |
| 5,359,708 | 10/1994 | Bloomer et al. | 395/148 |
| 5,381,523 | 1/1995 | Hayashi | 395/145 |
| 5,530,852 | 6/1996 | Meske, Jr. et al. | 395/600 |
| 5,572,625 | 11/1996 | Raman et al. | 395/2.69 |
| 5,581,686 | 12/1996 | Koppulu et al. | 345/340 |
| 5,583,762 | 12/1996 | Shafer | 395/794 |
| 5,689,703 | 11/1997 | Atkinson et al. | 707/103 |
| 5,692,157 | 11/1997 | Williams | 395/500 |
| 5,708,825 | 1/1998 | Sotomayor | 707/501 |
| 5,805,815 | 9/1998 | Hill | 395/200.48 |
| 5,809,317 | 9/1998 | Kogan et al. | 707/501 |
| 5,812,769 | 9/1998 | Graber et al. | 707/501 X |
| 5,838,906 | 11/1998 | Doyle et al. | 707/501 X |

OTHER PUBLICATIONS

"Putting Text on the Page", no later than Apr. 4, 1997.
Oliver Laumann, "Unroff Release 1.0 Information", no later than Apr. 4, 1997.
"Inserting Font Specifiers", no later than Mar. 12, 1997.
J.A. Zimmer, "Introduction", J A Zimmer (1995, 1996), May 23, 1996.
"Specification for RTF", no later than Mar. 12, 1997.
Sebastian Rahtz, "email—Subject: Re:SGML to {TeX, HTML} options", Feb. 27, 1997.
"OmniMark Sampler", no later than Mar. 12, 1997.

(List continued on next page.)

*Primary Examiner*—Joseph H. Feild
*Attorney, Agent, or Firm*—Computer Law ++

[57] ABSTRACT

A method and system are provided for managing digital documents by using links to allow navigation between documents and to create associations based on bridges between various combinations of document elements and software. Each bridge includes at least one coupling. Each coupling includes a target token identifier and a supplementary token identifier which allow software users to navigate between target and supplementary documents or to invoke supplementary software routines. Linked elements, such as text or graphics tokens, can overlap partially or entirely. Embedded links are allowed, but are not required.

23 Claims, 10 Drawing Sheets

OTHER PUBLICATIONS

Paul Prescod, "Introduction to DSSSL", Mar., 1997.
"Authoring Environment", no later than Mar. 12, 1997.
David T. Gray, "email—Subject: Legal Searcher 5 available on the net", Feb. 25, 1995.
Andrew Davison, "Annoucing curl v1.0", Mar. 1995.
"One–Button Web Pages", *Datamation*, Mar. 15, 1995, p. 17.
Unique SW Automatically Generates Indexes, *T.H.E.*, Mar. 1995, p. 32.
Mark L. Reynolds et al., "Metatext: Computerized Materials for the Study of Shakespeare's Language", at least as early as 1991.
"Get a Grip on Document Management" Brochure, The AIIM Show and Conference, Apr. 10–13, 1995, Moscone Center, San Francisco, California.
T. Baron, "Novell Takes Up Net–Access Gauntlet", *Communications Week*, Feb. 13, 1995, pp. 15, 16.
D. Rubin, "Cyberleaf: Text To Web The Easy Way", *Open Systems Today*, Feb. 6, 1995, pp. 38–40.
P. Ores, "Can Form Follow Content?", *PC Magazine*, Nov. 9, 1993, pp. 203–235.
J. Karney, "InContext Makes SGML Documents As Easy As Paper", *PC Magazine*, Dec. 20, 1994, p. 44.
H. Brown et al., "An Object–Oriented Toolkit for ODA and HyperODA",*ACM SIGDOC 1993*, pp. 29–41.
R. Rada, "Converting a Textbook to Hypertext", *ACM Transactions on Information Systems*, vol. 10, No. 3, Jul. 1992, pp. 294–315.
R. Botafogo et al., "Structural Analysis of Hypertexts: Identifying Hierarchies and Useful Metrics", *ACM Transactions on Information Systems*, vol. 10, No. 2, Apr. 1992, pp. 142–180.
M. Harrison et al., "Numbering Document Components", UCB/CSD Computer of Science Division, Jun. 30, 1990, pp. 1–20.
R. Amur et al., "Short Communication—TMS: A Free–Form Text–Management System", *Software—Practice and Experience*, vol. 20(3), Mar. 1990, pp. 321–324.
"Electronic Documents Laboratory Research at EP'88", *Document Manipulation and Typography*, J.C. van Vliet (ed.), Jan. 1989.
H. Eirund et al., "Knowledge Based Document Classification Supporting Integrated Document Handling", ACM Conference on Office Information Systems, 1988, pp. 189–196.
U. Hahn et al., "Automatic Generation of Hypertext Knowledge Bases", ACM Conference on Office Information Systems, 1988, pp. 182–188.
J. Coombs et al., "Markup Systems and The Future of Scholarly Text Processing", *Communications of the ACM*, vol. 30, No. 11, Nov. 1987, pp. 933–947.
J.R. Cowie, "A Direct Access Technique for Sequential Files with Variable Length Records", *Software—Practice and Experience*, vol. 17(10), Oct. 1987, pp. 719–728.
J. Smith et al., "Formatting Text Accessed Randomly", *Software—Practice and Experience*, vol. 17(1), Jan. 1987, pp. 5–16.
R. Trigg et al., "TEXTNET: A Network–Based Approach to Text Handling", *ACM Transactions on Office Information Systems*, vol. 4, No. 1, Jan. 1986, pp. 1–23.
C. Faloutsos, "Access Methods for Text", *Computing Surveys*, vol. 17, No. 1, Mar. 1985, pp. 49–73.
G. Kimura et al., "The Structure of Abstract Document Objects", ACM Conference on Office Information Systems, 1984, pp. 161–169.
R. Furuta et al., "Document Formatting Systems: Survey, Concepts, and Issues", *Computing Surveys*, vol. 14, No. 3, Sep. 1982, pp. 417–472.
O. Strömfors et al., "The Implementation and Experiences of a Structured–Oriented Text Editor", ACM SIGOA Conference on Office Information Systems, 1982, pp. 22–27.
D. Chamberlin et al., "JANUS: An Interactive System For Document Composition", ACM SIGOA Conference on Office Information Systems, 1982, pp. 82–91.
J.S. Moore, "The TXDT Package—Interlisp Text Editing Primitives", Xerox Palo Alto Research Center, Jan. 1981, pp. 1–32.
I. Macleod, "Design and Implementation of a Display Oriented Text Editor", *Software—Practice and Experience*, vol. 7, 1977, pp. 771–778.
G.F. Coulouris et al., "The Design and Implementation of an Interactive Document Editor", *Software—Practice and Experience*, vol. 6, 1976, pp. 271–279.
G. Berns, "Description of Format, a Text–Processing Program", *Communications of the ACM*, vol. 12, No. 3, Mar. 1969, pp. 141–146.
"CADleaf Batch—Powerful graphic translation with Job Scheduling" product brochure, Carberry Technology.
"DynaText—Electronic Book Publishing and Delivery System" product description and assorted materials, Electronic Book Technologies.
Disk—"German Priority Disk plus Language Sampler", Transparent Language, copyright 1992, (including 4 printouts of screen–shots).

(PRIOR ART)

(PRIOR ART)

SYSTEM AND METHOD PROVIDING NAVIGATION BETWEEN DOCUMENTS BY CREATING ASSOCIATIONS BASED ON BRIDGES BETWEEN COMBINATIONS OF DOCUMENT ELEMENTS AND SOFTWARE

FIELD OF THE INVENTION

The present invention relates to the management of digital documents, and more particularly to the use of links to allow navigation between documents and to create associations between words, images, sounds, and other document elements and software for manipulating document elements.

TECHNICAL BACKGROUND OF THE INVENTION

Increases in processing capacity and speed have enabled computing systems, both stand-alone and networked, to make information more widely available than ever. Many tools have emerged to promote the efficient management and presentation of information, but software users and developers agree that improvements are still needed.

The ability to present digitized information in a meaningful manner is critical. Current word processing and text editing programs use structured document architectures to provide control and flexibility while presenting information in a desired manner. One approach uses the Standard Generalized Mark-up Language ("SGML") specified in the 1986 International Standards Organization Standard No. 8879. Other mark-up languages are used in Folio infobases, Microsoft Word documents, Corel WordPerfect documents, UNIX troff documents, and various hyperlinks and hypertext.

Most mark-up languages provide "links" which associate a particular, pre-selected location in a primary text file with additional text, images, or other information. By following these links, a user receives additional information that expands or explains information contained in the given text. Application programs such as web browsers and indexed text viewers allow users to follow such links to additional information.

Figure 1:
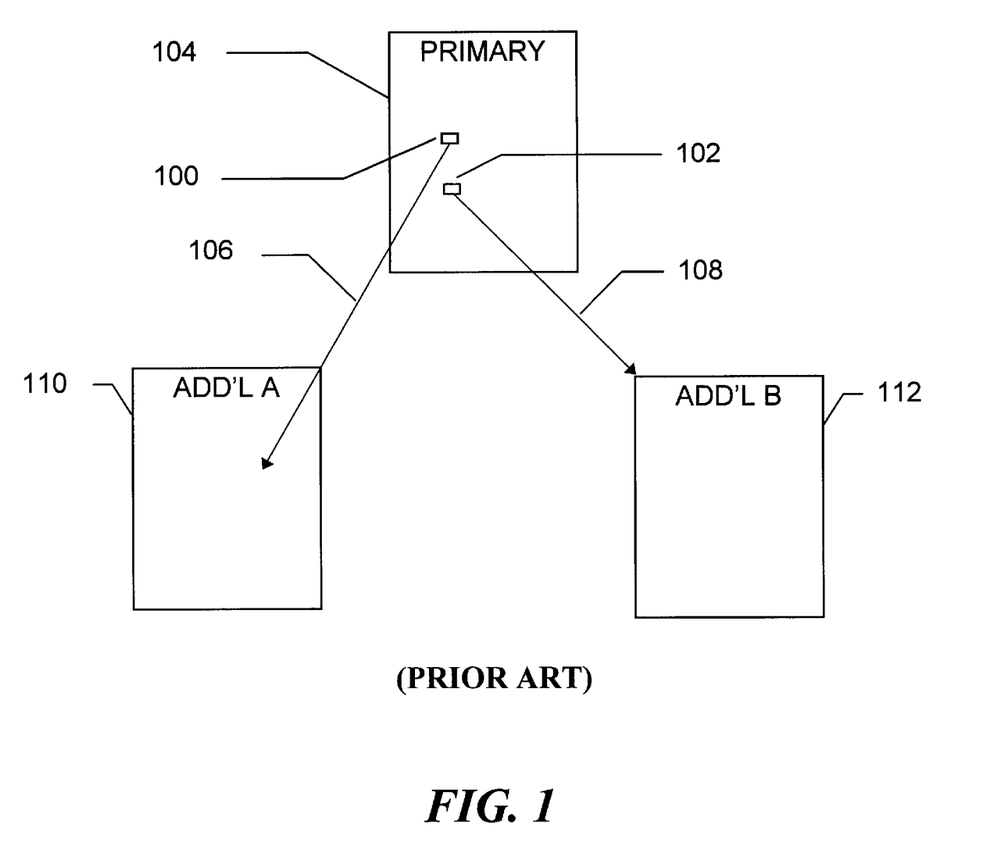
FIG. 1 illustrates a navigational structure implementation which uses embedded links according to the prior art.

As shown in FIG. 1, links are typically created by embedding control characters, pointers, or other locating or addressing mechanisms 100, 102 within a primary file 104 of text or other information. Such embedded links 106, 108 associate additional information in the primary file 104 (or in other files 110, 112) with predetermined locations in the primary file 104 by working with viewing software to effectively attach the information to the location of the embedded addressing mechanisms 100 or 102. A link can associate a particular location in the primary file 104 with another file 112, or the link can associate a particular location in the primary file 104 with a specific position in the current file 104 or a specific position in another file 110. In general, the embedded links 106, 108 point outward from the primary file 104 to the additional information 110, 112 because the necessary addressing mechanisms 100, 102 are maintained at the "jumping off" location in the primary file 104.

However, maintaining the necessary addressing information 100, 102 within the primary file 104 has drawbacks. Both embedded links, and the viewing or other software that uses the links, must function correctly. This requires careful development and extensive testing. Because of the embedded nature of links such as the links 106, 108, the primary file 104 must be edited every time a change is made in a link. Accordingly, write privileges giving full access to the contents of the primary file 104 must be granted.

Allowing write access to the primary file 104 in order to edit embedded links may be difficult. The primary file 104 may be owned by a different individual or company than the owner of the additional information 110, 112 to which links point. Even if all the information is owned by one company, one group or division may be responsible for the primary file 104 while others are responsible for the additional information 110, 112. Furthermore, development of the primary file 104 may be separate from the development of the additional data or information 110, 112, with the final integration to be performed during an integration and testing phase. Therefore, obtaining the necessary knowledge and understanding of the specific implementation to successfully edit the primary file 104 may require the involvement of that file's developer(s) during the integration phase.

Figure 2:
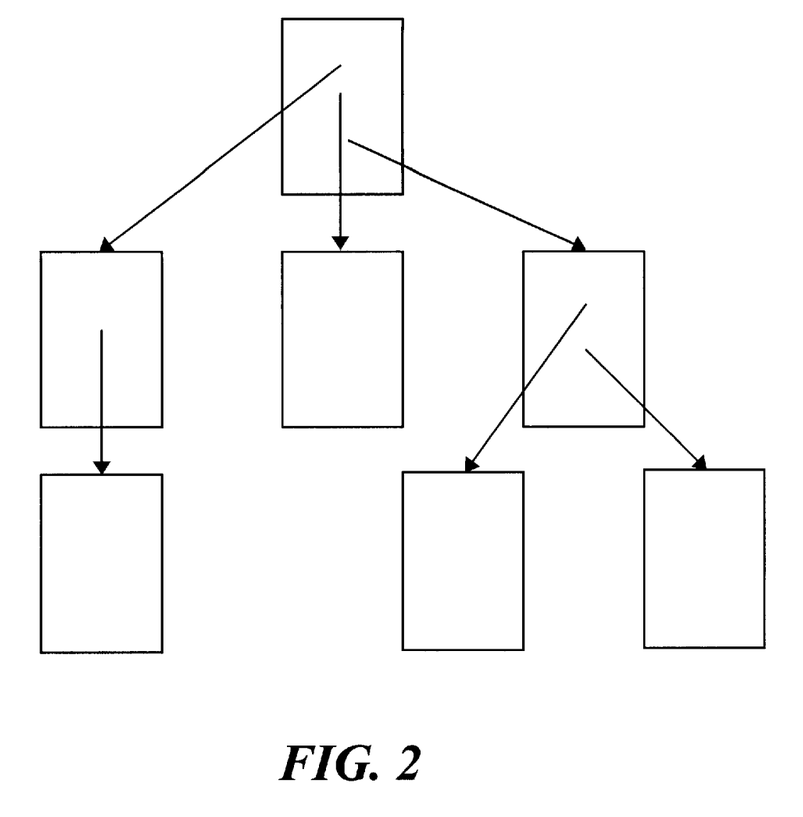
FIG. 2 illustrates a hierarchical navigational structure which may be implemented using prior art embedded links or using the present invention.
Figure 3:
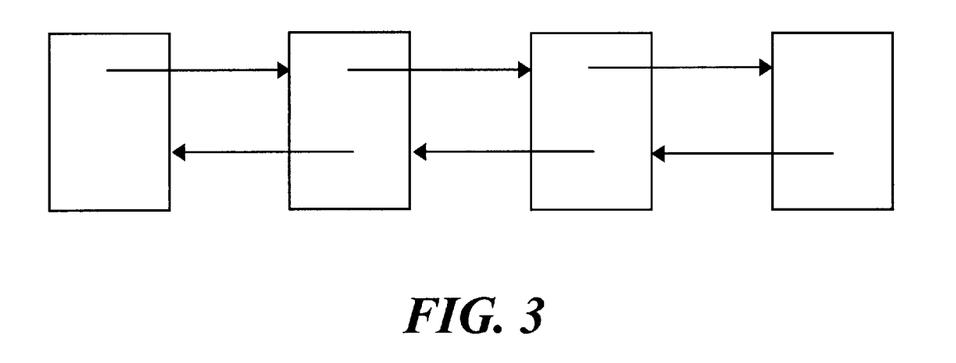
FIG. 3 illustrates a linear navigational structure which may be implemented using prior art embedded links or using the present invention.
Figure 4:
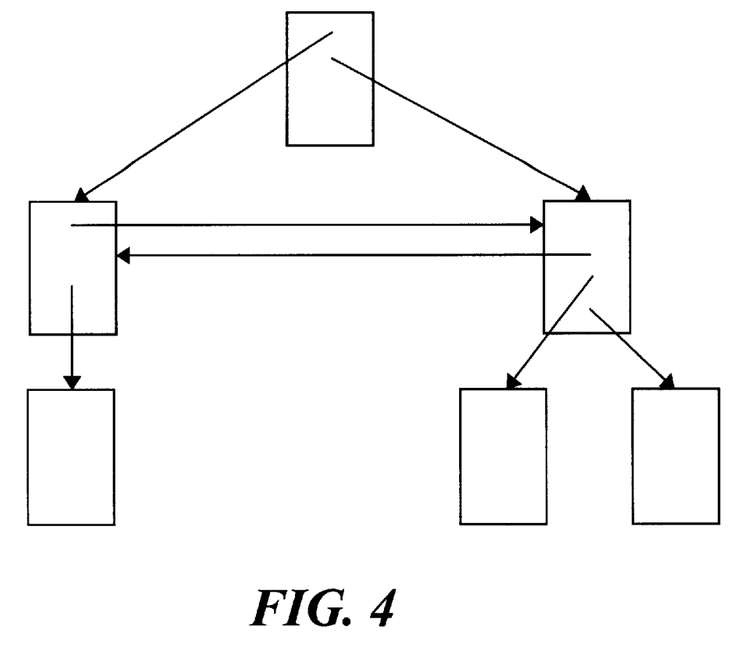
FIG. 4 illustrates a combination linear and hierarchical navigational structure which may be implemented using prior art embedded links or using the present invention.
Figure 5:
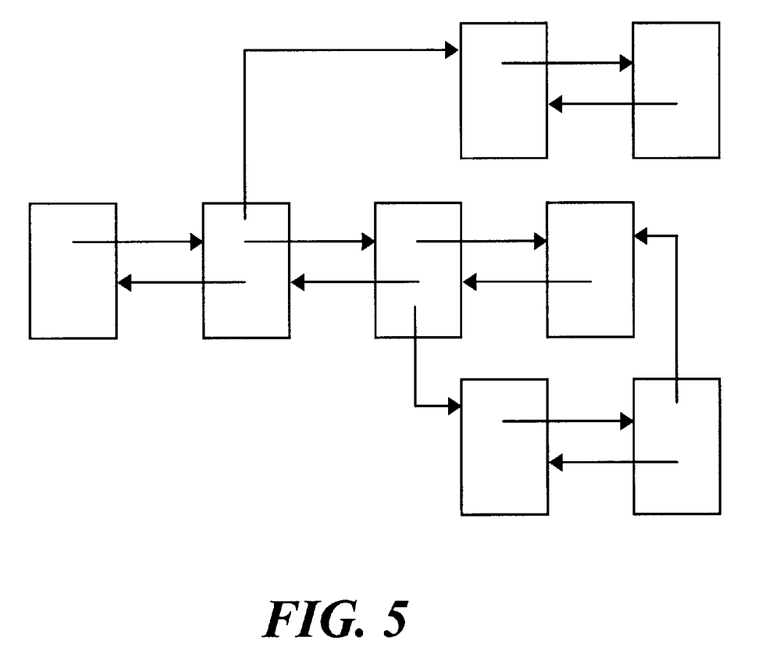
FIG. 5 illustrates a linear with alternatives navigational structure which may be implemented using prior art embedded links or using the present invention.
Figure 6:
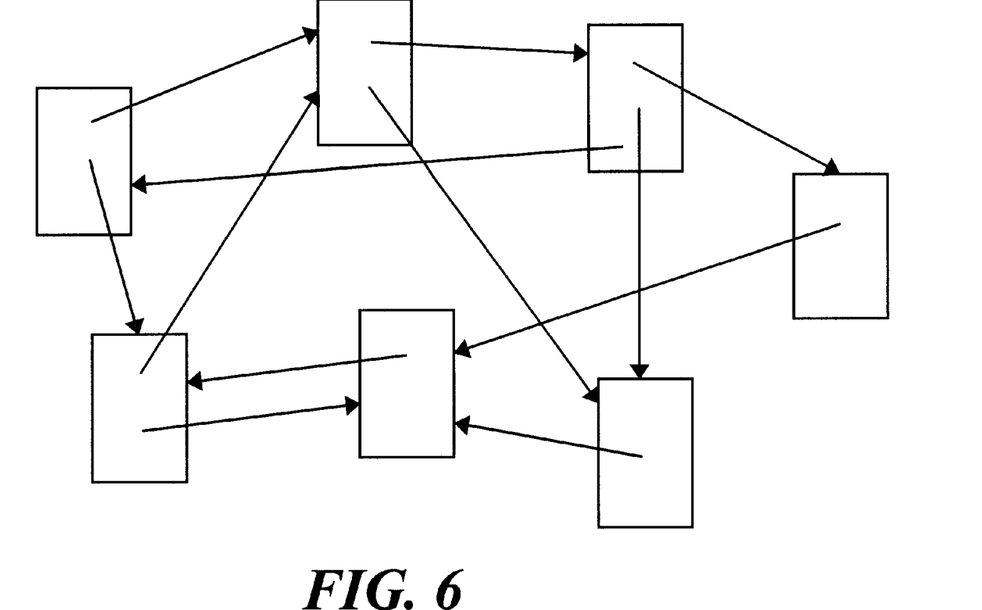
FIG. 6 illustrates a web navigational structure which may be implemented using prior art embedded links or using the present invention.

The primary function of links is to provide a mechanism for managing and organizing large amounts of information for dissemination to an audience. This is mainly done by implementing a navigational structure that lets the user traverse the information along well-defined paths. The specific navigational structure implemented is a critical factor in determining both the ease with which one manages and disseminates the information, and the ease with which one traverses and consumes the desired information. Widely-used navigational structures include hierarchical (FIG. 2), linear (FIG. 3), combination of linear and hierarchical (FIG. 4), linear with alternatives (FIG. 5), and web (FIG. 6) structures. These structures are typically implemented using embedded links, but after reading about the present invention those of skill in the art will appreciate that these and other navigational structures may also be implemented without relying solely on embedded links.

Figure 7:
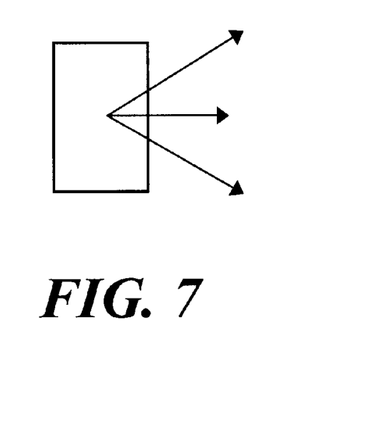
FIG. 7 illustrates a one-to-many navigational structure which may be implemented using prior art embedded links or using the present invention.
Figure 8:
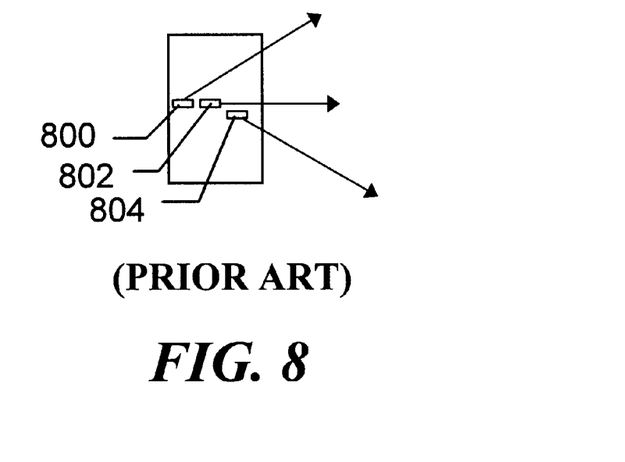
FIG. 8 illustrates a prior art implementation of the navigational structure shown in FIG. 7.

As illustrated in FIG. 1, conventional embedded linking implementations are rigid and inflexible because a specific location in the primary file 104 can associate with only one other source of additional information. Typical links 106, 108 are "one-to-one" in that they provide a jump from one location to only one other location. This limits the navigational structures which can be implemented, which in turn makes it harder to disseminate or obtain the desired information. For instance, the navigational structure shown in FIG. 7, which contains three links originating at a single location but jumping to separate destinations, is only approximated by an implementation such as that shown in FIG. 8. Limits imposed by conventional link implementations require the use of three close, but nonetheless separate, locations 800, 802, 804 as starting points.

Thus, it would be an advancement in the art to provide a system and method for providing a linking mechanism which allows direct access to multiple pieces of information from any one location in the primary file.

It would also be an advancement in the art to provide a system and method for modifying mark-up links without editing the primary data file.

Such a system and method for enhanced document linking are disclosed and claimed below.

BRIEF SUMMARY OF THE INVENTION

The present invention provides a method and system for enhancing digital documents without requiring embedded links. In one embodiment, a computerimplemented method begins by choosing at least one target document containing digital target tokens and at least one supplementary document containing digital supplementary tokens and then creating a bridge between the target document and the supplementary document without requiring in either document an embedded link to the other document. The bridge includes at least one coupling. Each coupling in the bridge includes a target token identifier and a supplementary token identifier which, in combination with browsing or editing software, allow navigation between the target document and the supplementary document, or navigation between the target document and supplementary software which manipulates the target document.

The target and supplementary tokens can be text, pictures, sound, and so forth. Unlike conventional methods, the present invention allows tokens to overlap. One token can be a subset of another token, or two tokens can be coextensive. One or more bridges may be used to link tokens. Embedded links are allowed, but not required.

Unlike conventional embedded link approaches, the present invention does not require modification of either linked document. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a method and apparatus for managing digital documents by using links to allow navigation between documents and to create associations between various combinations of document elements and/or between document elements and document-related software. Each document element ("token") may be an individual digitized character, word, phrase, image, sound, a set of such tokens which are adjacent, a logical group of such tokens, or any other element of information capable of being defined, stored, and displayed in a computer. Different tokens may have overlapping or identical content. For instance, each use of the name "Puck" in a document may be a different token.

The invention may be used with stand-alone computers, with computers connected by a network, or both. The computers may be workstations, desktop computers, laptop computers, mobile computers, servers, clients, peers, or other computers. Suitable networks include local area networks, metropolitan area networks, wide area networks, the Internet, or any combination thereof. "Internet" as used herein includes variations such as a private Internet, a secure Internet, a value-added network, a virtual private network, a portion of the Internet such as the World Wide Web, or an intranet.

As noted above, embedded link implementations of document navigational structures have serious drawbacks. To overcome limitations imposed by conventional embedded link implementations, the present invention provides a way to link documents which allows, but does not require, embedded links. The present invention is illustrated mainly through examples that link two documents, but those of skill in the art will appreciate that the invention may also be used to link locations within a single document, and to link multiple documents in navigational structures such as those shown in FIGS. 2–7.

Figure 9:
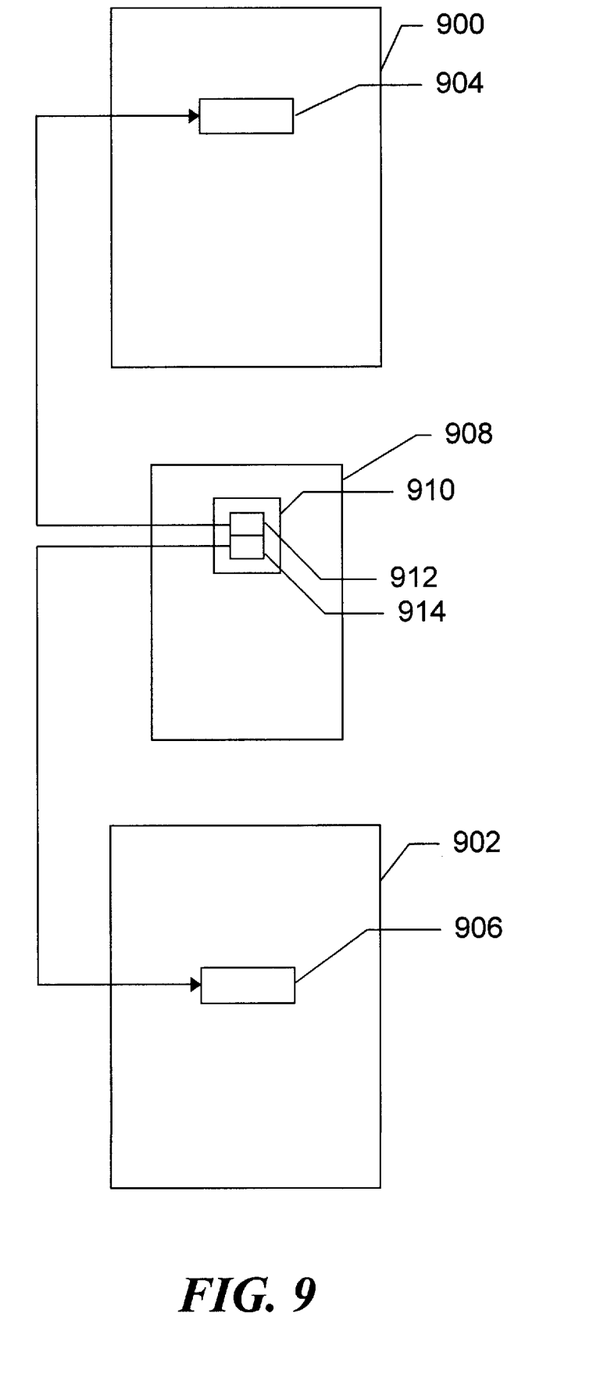
FIG. 9 illustrates a configuration implementing a navigational structure according to the present invention.

FIG. 9 illustrates an embodiment of the current invention which links a target document 900 to a supplementary document 902. User or application data contained in the target document 900 may be displayed on a computer monitor using software whose functional requirements and suitable implementations will be apparent to one of skill in the art. Suitable software may run under Windows 95, Windows NT, Macintosh, X-Windows, or other familiar graphical operating environments, with the target document 900 displayed in an active window. Alternatively, in a character interface such as MSDOS, the target document 900 data may be text displayed on the monitor. In either environment, the file 900 is displayed through an appropriate user interface. The supplementary document 902 contains additional information to be displayed upon the request of the viewer of the target document 900.

The target document contains at least one digital target token 904. A "digital target token" or "target token" is a target document element being associated with at least one supplementary document element. The supplementary document contains at least one digital supplementary token 906. A "digital supplementary token" or "supplementary token" is a supplementary document element being associated with at least one digital target token. Either token can include, individually or in any combination, digitized character(s), word(s), phrase(s), file(s), page(s), site(s), image(s), or sound(s). For instance, the target token 904 and the supplementary token 906 may include both a graphical image and its accompanying caption. Those of the skill in the art will recognize that a supplementary token can also serve as a digital target token, and vice versa.

The association of the tokens is performed by a bridge 908. The bridge 908 allows navigation between the target token 904 and the supplementary token 906. In one embodiment, the bridge 908 is implemented as data stored in a file. Software configured to read or to read and write information stored in the bridge 908 can be implemented as a software application program written in a programming language such as Pascal, C++, C, Java, assembly, and/or other languages, to be executed on a computer.

The bridge 908 contains one or more couplings 910. Each coupling 910 contains a target token identifier 912 and a supplementary token identifier 914. The target token identifier 912 identifies the target token 904 by position and the supplementary token identifier 914 identifies the supplementary token 906 by position.

The token identifiers 912, 914 contain enough addressing and identifying information to unambiguously identify the token in question. For example, in one embodiment each token identifier includes a resource name, a start address, an end address, a length, and a type identifier. The resource name can be implemented as a Uniform Resource Locator (URL) as is typically done on the World Wide Web. The start address can be implemented as an offset, most typically a number of bytes, from the start of the resource name. The end address can also be implemented as an offset, and the length can be the total length of the token in bytes. The type indicator identifies a format of the specific token. Suitable formats include ASCII text, .JPEG images, .WAV sounds, and/or other formats for digital encoding. In yet another embodiment, the start address includes a physical or virtual memory address identifying the start of the token.

The content of a supplementary token may be displayed (or played, for sounds) upon the activation of a trigger by the user. In one embodiment, the trigger includes positioning a cursor over any part of the target token and then double clicking a mouse button. The software follows the bridged path between the target and supplementary tokens, and identifies supplementary token information which is displayed, subject to scrolling and other actions familiar in the art. In a graphical operating environment, the information from the supplementary token may be displayed in a window separate from the window showing the target token. In a non-graphical environment, the information may be displayed as text on the monitor.

All identifying and addressing information needed to link the target token 904 and the supplementary token 906 is preferably contained within the bridge 908. Thus, it is possible, but not necessary, for the target document 900 and the supplementary document 902 to have the same format. The document format (including layout) is independent of the associated addressing format contained in the coupling 910.

Such independence of the target document 900, supplementary document 902, and bridge 908 make possible diverse embodiments. The target document 900, supplementary document 902, and bridge 908 may reside in a single computer, or they may reside on two or more separate computers connected in a network or by other communication means. Different individuals or entities may be responsible for, or have rights in, the three components 900, 902, 908.

Figure 10:
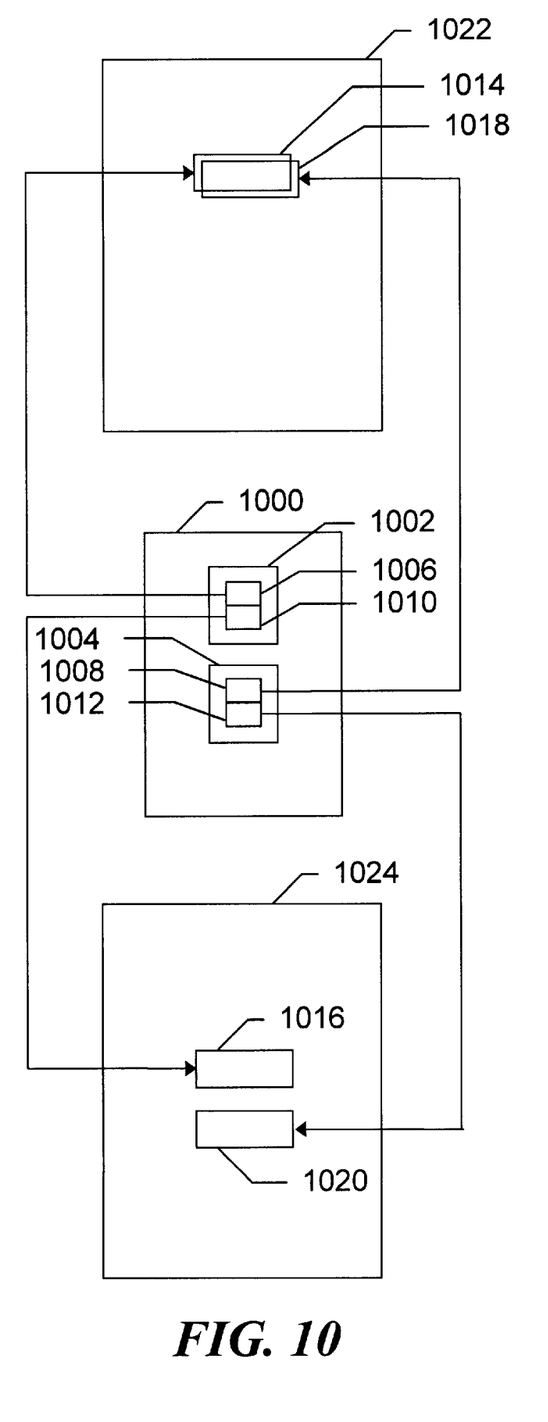
FIG. 10 illustrates a first alternative configuration according to the present invention.

FIG. 10 shows another configuration. A bridge 1000 contains two couplings, 1002, 1004. Each coupling 1002, 1004 contains a target token identifier (1006, 1008, respectively) and a supplementary token identifier (1010, 1012, respectively). The coupling 1002 links a target token 1014 with a supplementary token 1016, and the coupling 1004 links a target token 1018 with a supplementary token 1020. The target tokens 1014, 1018 reside in a target document 1022, and the supplementary tokens 1016, 1020 reside in a supplementary document 1024.

The target tokens 1014, 1018 overlap in the sense that part of one token is part of the other token, and vice versa. For example, in a character file containing the text sequence "Shakespeare's Romeo and Juliet," the token 1014 might be the string "Shakespeare's Romeo" and the token 1018 might be "Romeo and Juliet." In the configuration shown, the supplementary token identifiers 1010, 1012 point to two independent (non-overlapping) supplementary tokens 1016, 1020.

Figure 11:
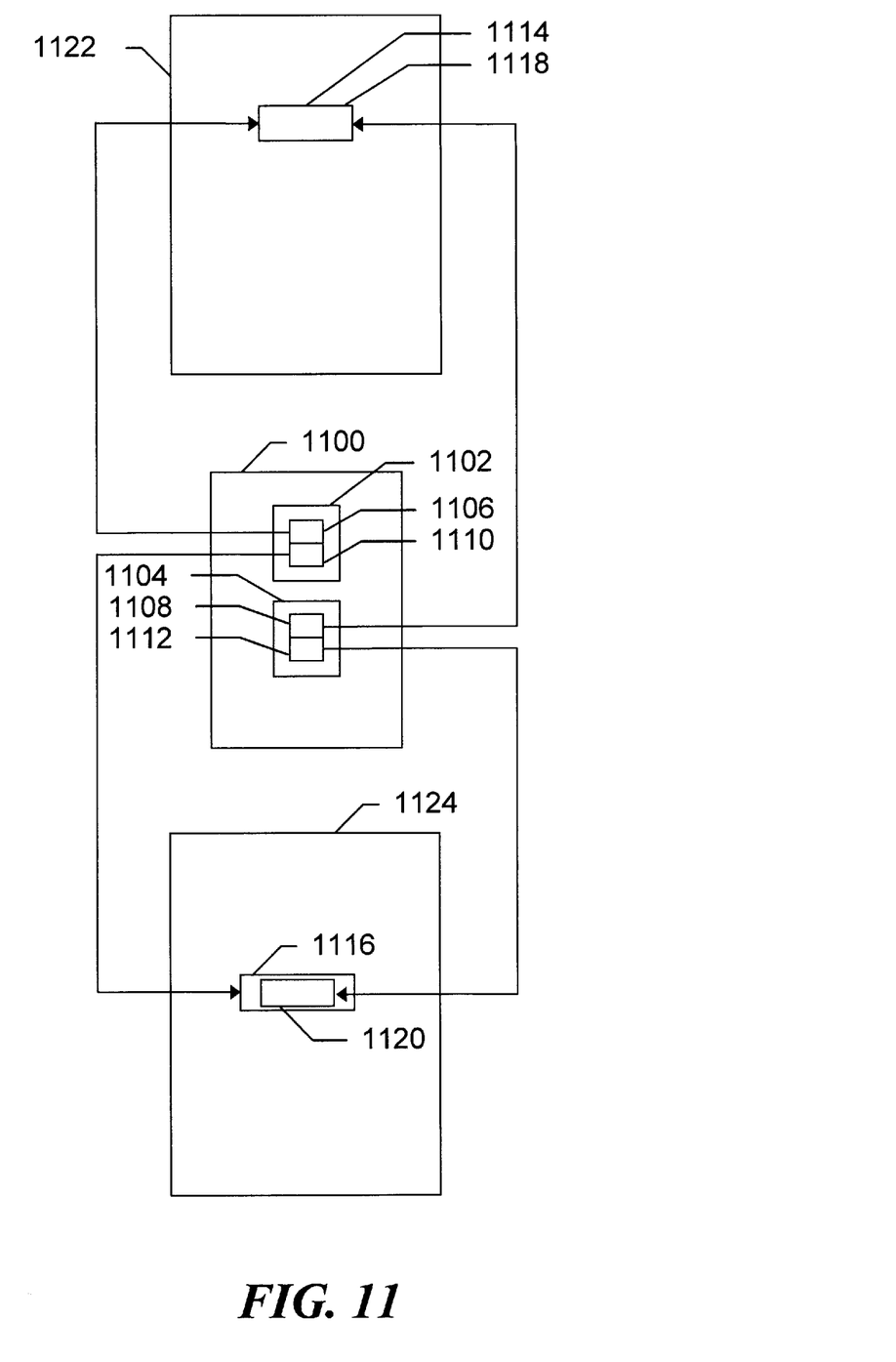
FIG. 11 illustrates a second alternative configuration according to the present invention.

The degree of token overlap can vary. Two tokens may overlap partially, with neither fully contained in the other. Two tokens may be identical (coextensive), or one may be a proper subset of the other. FIG. 11 shows two coextensive tokens 1114, 1118 in a target document 1122. Overlap may also occur with supplementary tokens; in the illustrated configuration, supplementary token 1120 is a proper subset (and hence is overlapped by) supplementary token 1116.

Figure 12:
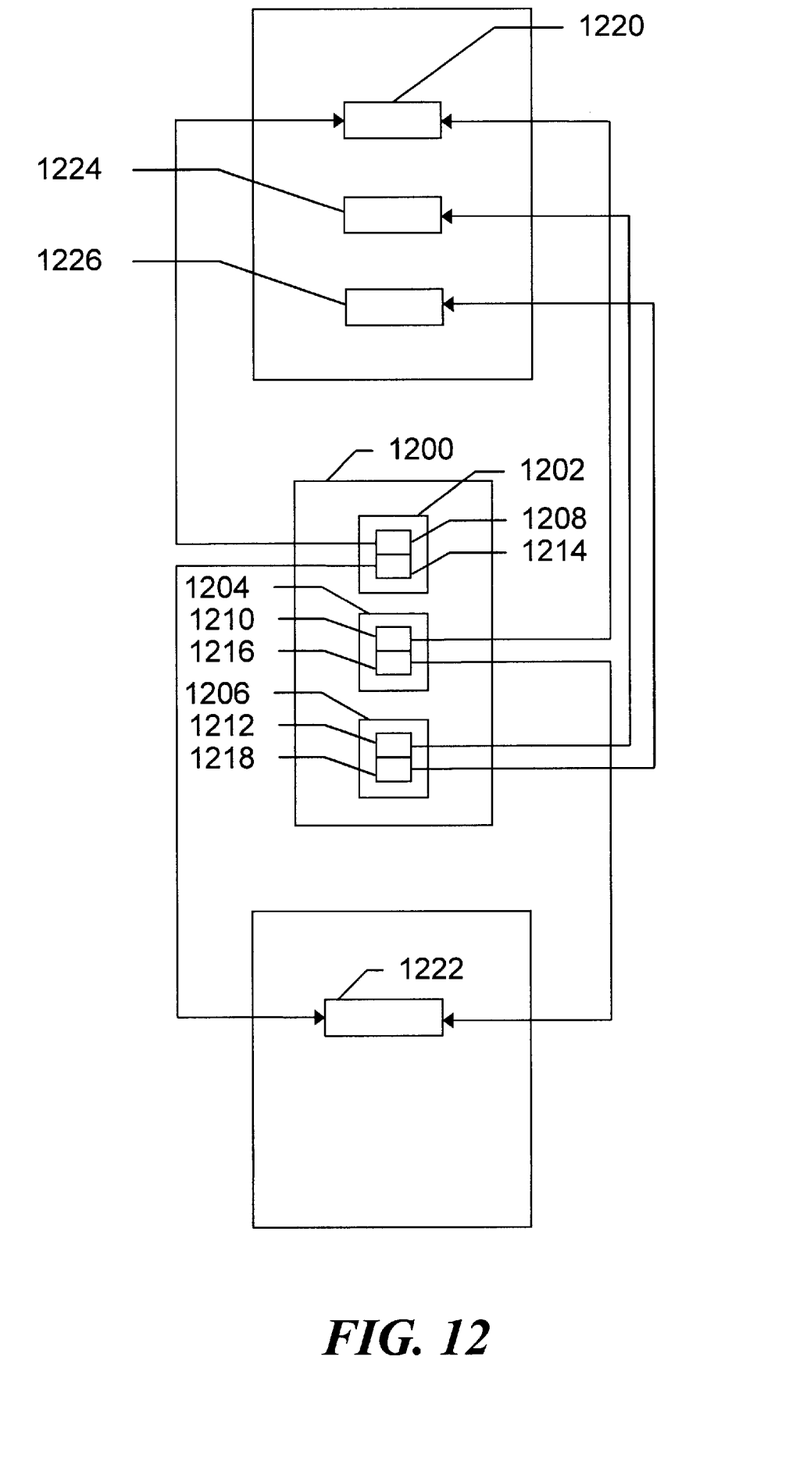
FIG. 12 illustrates a third alternative configuration according to the present invention.

A given token may also be identified in more than one coupling. FIG. 12 shows a configuration in which a coupling 1202 and a coupling 1204 both identify the same target token 1220. A supplementary token 1222 is similarly identified by two couplings, further illustrating the flexibility of the present invention for linking documents. FIG. 12 also shows a coupling 1206 which links a target token 1224 with a supplementary token 1226 located in the same document as the target token 1224. Thus, a given document may serve both as a target document and as a supplementary document.

Those of skill in the art will appreciate that the Figures illustrate only a few of the many configurations that are possible with the present invention. In general, couplings may link one target token to one or more supplementary tokens located in the same and/or other documents. Couplings may likewise link multiple target tokens in one or more documents to a single supplementary token located in a document containing the target tokens or in another document. Many-to-many linkages are also possible. Although the couplings shown each contain one target token identifier and one supplementary token identifier, in other embodiments a coupling includes more than one target token identifier, more than one supplementary token identifier, or both.

Software which allows navigation of the links may allow bidirectional or unidirectional movement between coupled tokens. Depending on the direction of navigation, the same token may serve as either a target token or a supplementary token. The software may permit bidirectional navigation between a target document and a supplementary document, in addition to navigation between individual tokens, by providing cursor-positioning and scrolling capabilities within each document.

When one target token is associated with more than one supplementary token, the user preferably decides which supplementary token to display, delete, edit, or otherwise operate on. In one embodiment, the user is prompted to select from a list identifying the supplementary tokens. In another embodiment, the available tokens are displayed in a predetermined order according to alphabetic order, relative currency of access, or another criterion.

Figure 13:
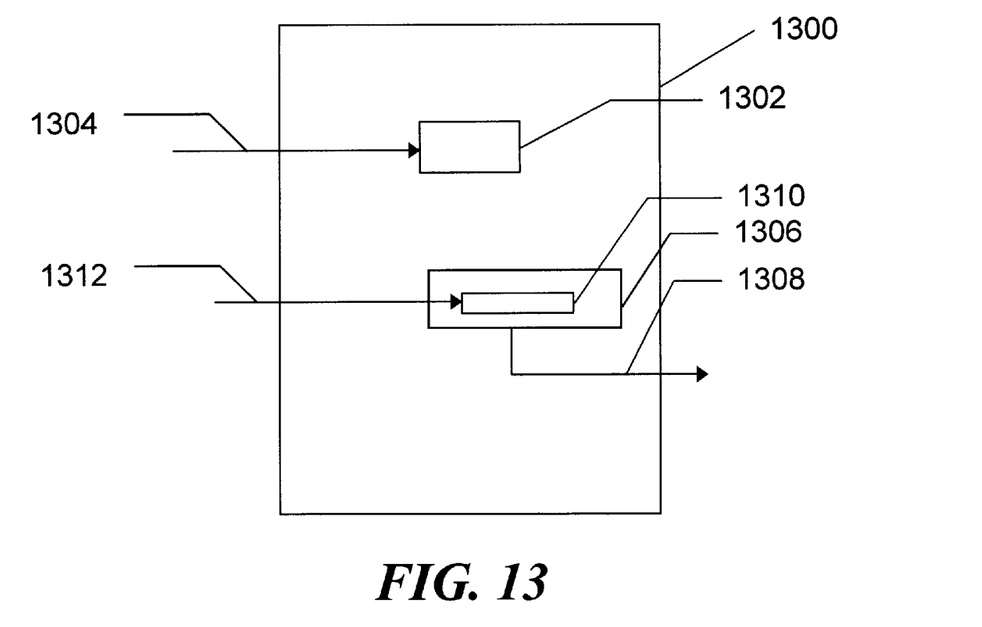
FIG. 13 illustrates a fourth alternative configuration showing both prior art embedded linking and the novel linking of the present invention.

FIG. 13 shows a document 1300 containing both a token 1302 which forms part of a link 1304 according to the present invention and an addressing mechanism 1306 such as an HTML anchor which creates a conventional embedded link 1308. The independent linking architecture of the present invention may be used without altering the contents of the target (or supplementary) document 1300. In particular, embedded links may be left in place. Indeed, another token 1310 may be defined to create a link 1312 according to the invention, such that the link 1312 and the embedded link 1308 use overlapping contents of the document 1300.

Whether the embedded link 1308 remains active depends on the application program implemented to provide access to the document 1300. In one embodiment, the application program will, in addition to supporting the linking architecture described herein, support one or more currently existing embedded linking architectures such as HTML. Addressing mechanisms for embedded links may be automatically parsed to produce tokens according to the present invention, allowing batch or on-the-fly conversion from embedded to bridge-coupled navigation. In another embodiment, the application program will only support the bridge-coupled navigation described herein and will not support embedded links.

Figure 14:
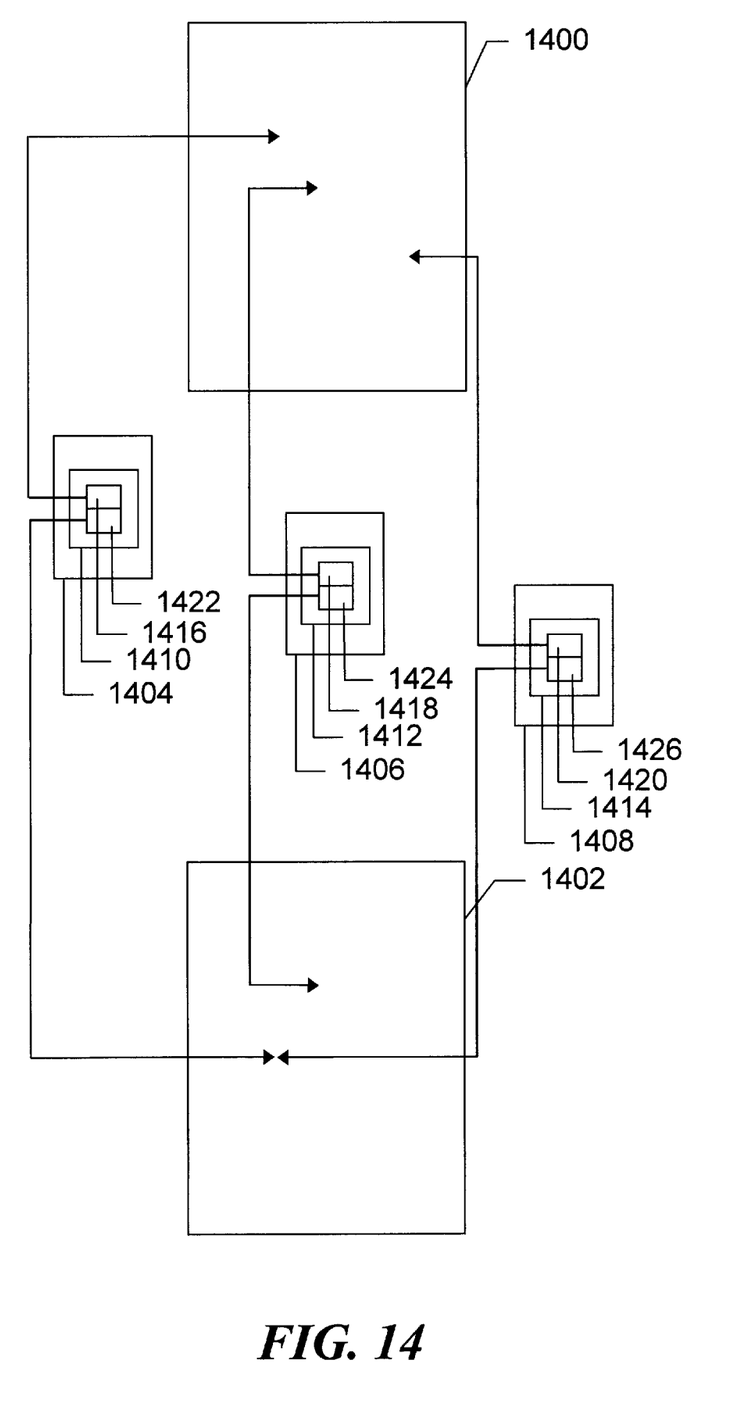
FIG. 14 illustrates a fifth alternative configuration according to the present invention.

As illustrated in FIG. 14, bridges and their couplings can be used with functions other than basic linking. As shown, two documents 1400, 1402 are linked by three bridges 1404, 1406, 1408. Each bridge 1404, 1406, 1408 contains a coupling 1410, 1412, 1414, respectively. Each coupling 1410, 1412, 1414 contains a target token identifier 1416, 1418, 1420, respectively, as well as a supplementary token identifier 1422, 1424, 1426, respectively. For clarity of illustration, only two documents, three bridges, one coupling per bridge, and two identifiers per coupling are shown. But those of skill will appreciate that additional documents (or additional versions of a given document), additional bridges, additional couplings per bridge, and additional identifiers per coupling may exist in a given embodiment.

Multiple bridges may be maintained to represent links at a given point in time (such as in conjunction with version control); links available to persons or processes having a specified security clearance; links relating to a given topical view of the documents (such as political versus religious perspectives); links relating to a given personal view of the documents (such as by different commentators); links owned or maintained by a given entity; or links grouped according to other criteria. For instance, in a classroom, documents 1400 and 1402 might hold copies of Shakespeare's plays Hamlet and Lear, and each bridge 1404, 1406, 1408 might hold links specified by a given student, with each student being assigned the task of comparing the two plays.

Each bridge 1404, 1406, 1408 can be implemented as a doubly linked list, array, or other collection of couplings. The multiple bridges 1404, 1406, 1408 can similarly be gathered in a list, array, or other data structure specified by one of skill in the art. The bridges, and the couplings within each bridge, may be ordered according to address, currency of access, or in other ways. One or more couplings in one or more bridges may be treated by the software as active at any given time.

A given coupling may contain version control, ownership, or other information in addition to the token identifiers. A given bridge may contain similar information, including a digital signature based on the couplings, in addition to the couplings.

A token identifier may identify a token in various ways. One embodiment specifies the starting memory address and the ending memory address of the token's contents; one specifies the starting address and a length; others specify a file and an offset into the file instead of a starting address; still others specify a token type such as character, byte, word, paragraph, or image instead of a length or an ending address. Some embodiments divide a document into components, such as fixed-size sectors, blocks or pages, and then specify token position by specifying the document file, the component number, and the offset into the component. Tokens may also be defined using a list or other collection of simpler token definitions. For instance, all instances of the word "Ophelia" in a document could be treated as a single token.

Figure 15:
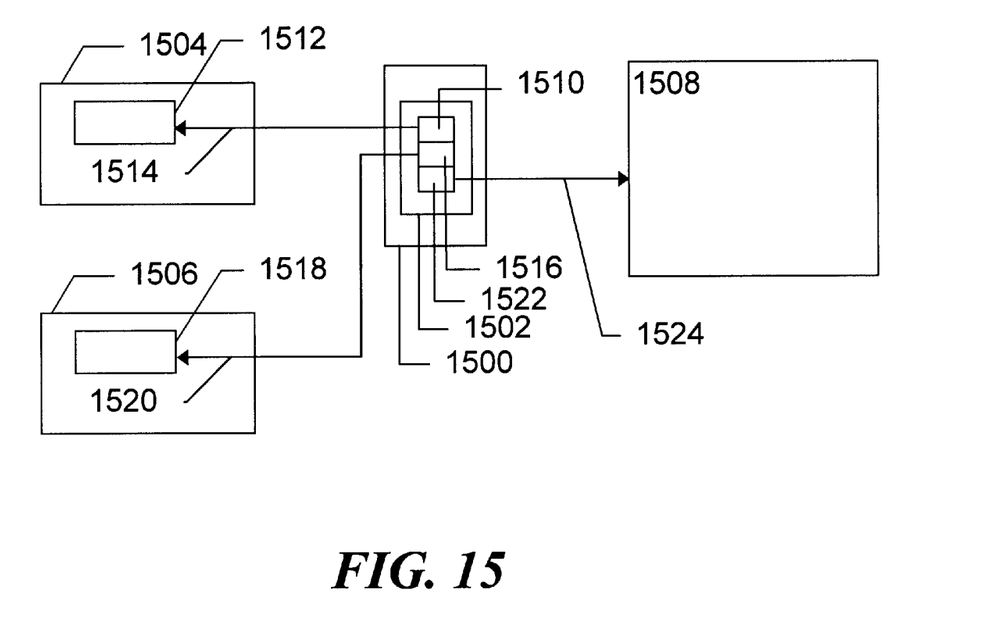
FIG. 15 illustrates a configuration linking documents and software according to the present invention.

As illustrated in FIG. 15, bridges may be used not only to create links between documents but also to link documents with related software. A bridge 1500 includes a coupling 1502 which links a target document 1504, a supplementary document 1506, and a related program 1508. A target token identifier 1510 identifies a target token 1512 by a link 1514 into the target document 1504. A first supplementary token identifier 1516 identifies a first supplementary token 1518 by a link 1520 into the supplementary document 1506. A second supplementary token identifier 1522 treats the software 1508 as a token, identifying it through a link 1524. In an alternative configuration, the supplementary document 1506 is not referenced by the coupling 1502; only the target token 1512 and the software token 1508 are linked by the bridge 1500.

The software 1508 is supplemental in the sense that browsing, editing, querying or other software for utilizing links and tokens according to the invention is typically already present, as discussed above. In one embodiment, such browsing or other software is enhanced to interpret information such as that in the identifier 1522 and then invoke the software 1508. Other information available in the context, such as the user's most recently executed operation or the contents of the token 1512, may be provided by the invoking program as parameters to the invoked software 1508. Invocation of the software 1508 may be accomplished using an Application Programmer's Interface, fork( ), execute( ), process spawn, scheduling queue change, remote procedure call, or other mechanism for initiating (or resuming) execution of an identified computer program or routine; a wide variety of such mechanisms are known in the computer arts.

Suitable software 1508 may perform a wide variety of functions. By way of example only, and without limitation, possible scenarios include: creating an editor process with copies of the target document 1504 and supplementary document 1506 already loaded in separate windows and with cursors for the windows positioned at the tokens 1512 and 1518, respectively; initiating an Internet or database search for instances where contents of the tokens 1512 and 1518 are used in close proximity to one another;

creating a morphing sequence which uses the visual contents of the tokens 1512 and 1518 as its initial and final images; invoking an email program configured to included one or more of the tokens 1512, 1518 or documents 1504, 1506 as attachments to a new email message; and expanding or playing audio, visual, or audiovisual contents corresponding to the token 1512, when that token appears in the document 1504 merely as a text label, a thumbnail image. or another excerpted or summarized indication of fuller contents available on demand.

In summary, the present invention allows digital documents to be linked in a wide variety of navigational structures, without requiring write access to the linked documents, by using bridges. A given token in one document may be linked to one or more tokens in that document or in other documents, and/or linked to related software. The present invention may be used with conventional embedded linking technology, but embedded links are not required.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to perform document enhancement according to the present invention.

Those of skill will appreciate that steps in methods of the invention may be omitted, performed in a different order, or performed concurrently, subject to the requirement that claimed steps cannot be omitted for purposes of literal infringement analysis, and that steps which depend on the results of other steps must be performed only after the required results are available.

Those of skill in the art will also recognize that an embodiment of the present invention need not include all parts of the architecture described above. The invention may be embodied in other specific forms without departing from its spirit or essential aspects. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for enhancing digital documents without requiring embedded links, the method comprising the computer-implemented steps of:

providing a target document containing digital target tokens;

providing a supplementary document containing digital supplementary tokens; and creating a bridge between the target document and the supplementary document without requiring in either document an embedded link to the other document, the bridge including at least one coupling, each coupling including a target token identifier which identifies a target token and a supplementary token identifier which identifies a corresponding supplementary token, the method supporting navigation between the identified target token and the identified supplementary token.

2. The method of claim 1, wherein the bridge includes a first coupling identifying at least a first token, the bridge includes a second coupling identifying at least a second token, and the first and second tokens overlap.

3. The method of claim 2, wherein the first and second tokens are coextensive.

4. The method of claim 2, wherein the first token is entirely contained within the second token.

5. The method of claim 1, wherein the coupling identifies textual target tokens and textual supplementary tokens.

6. The method of claim 1, wherein at least one of the token identifiers identifies an image token.

7. The method of claim 1, wherein at least one of the token identifiers identifies a sound token.

8. The method of claim 1, wherein at least one of the token identifiers identifies software to be invoked.

9. The method of claim 1, wherein the method supports bidirectional navigation between the identified target token and the identified supplementary token.

10. The method of claim 1, wherein each token identifier identifies a token by specifying the position of the token in one of the documents.

11. The method of claim 10, wherein at least one of the token identifiers identifies a token by specifying a memory address.

12. The method of claim 10, wherein at least one of the documents is divided into components, and at least one of the token identifiers identifies a token by specifying an offset into a document component.

13. The method of claim 1, wherein at least one of the documents contains embedded links.

14. The method of claim 1, further comprising the step of maintaining multiple bridges linking the documents.

15. The method of claim 1, wherein the target document has a target document format, the supplementary document has a supplementary document format, and the format of each document is substantially independent of the contents of the other document.

16. A system for manipulating enhanced digital documents comprising:

a computer having a means for storing digital documents, a means for displaying digital documents, and a means for accepting input;

a target document containing digital target tokens;

a supplementary document containing digital supplementary tokens;

a bridge which links the target document and the supplementary document without requiring in either document an embedded link to the other document, the bridge including at least one coupling, each coupling including a target token identifier and a supplementary token identifier; and a means for using the bridge coupling to navigate between the target document and the supplementary document.

17. The system of claim 16, wherein the means for using the bridge coupling to navigate includes software capable of causing the tokens to be displayed on the computer.

18. The system of claim 17, wherein the software is also capable of editing the bridge.

19. The system of claim 17, wherein the software is also capable of invoking other software identified by one of the token identifiers.

20. A computer-readable storage medium configured with data and instructions which cause a computer to perform a method for enhancing digital documents without requiring embedded links, the method comprising the steps of claim 1.

21. The medium of claim 20, wherein the method comprises the steps of claim 2.

22. The medium of claim 20, wherein the method comprises the steps of claim 13.

23. The medium of claim 20, wherein the method comprises the steps of claim 14.

* * * * *